United States Patent
Groffman et al.

(10) Patent No.: US 11,267,200 B2
(45) Date of Patent: Mar. 8, 2022

(54) FILAMENT DRIVE APPARATUS

(71) Applicant: Generative Parametrics Limited, Melksham (GB)

(72) Inventors: Alexander Groffman, Melksham (GB); Thomas Oldaker, Melksham (GB)

(73) Assignee: Generative Parametrics Limited, Melksham (GB)

( * ) Notice: Subject to any disclaimer, the term of this patent is extended or adjusted under 35 U.S.C. 154(b) by 0 days.

(21) Appl. No.: 16/965,180

(22) PCT Filed: Jan. 30, 2019

(86) PCT No.: PCT/GB2019/050264
§ 371 (c)(1),
(2) Date: Jul. 27, 2020

(87) PCT Pub. No.: WO2019/150112
PCT Pub. Date: Aug. 8, 2019

(65) Prior Publication Data
US 2021/0046702 A1    Feb. 18, 2021

(30) Foreign Application Priority Data

Jan. 31, 2018 (GB) ..................................... 1801563

(51) Int. Cl.
*B29C 64/227*    (2017.01)
*B29C 64/321*    (2017.01)
(Continued)

(52) U.S. Cl.
CPC .......... *B29C 64/227* (2017.08); *B29C 64/118* (2017.08); *B29C 64/321* (2017.08); *B33Y 30/00* (2014.12)

(58) Field of Classification Search
CPC ... B29C 64/227; B29C 64/321; B29C 64/118; B29C 64/20; B29C 64/30; B33Y 30/00
See application file for complete search history.

(56) References Cited

U.S. PATENT DOCUMENTS 2,875,624 A * 3/1959 Lathrop ............... F16H 7/00
474/100
4,179,056 A   12/1979 Schmerling
(Continued)

FOREIGN PATENT DOCUMENTS

DE    1510531 A1    3/1970
DE    1627576 A1    8/1970
(Continued)

OTHER PUBLICATIONS

Fotomas, Belt Driven and Feeding Extruder by Fotomas,Thingiverse.com, Feb. 2016, https://thingiverse.com/thing:1374503, MakerBot Thingiverse, All Pages.

*Primary Examiner* — Joseph S Del Sole
*Assistant Examiner* — Baileigh Kate Darnell
(74) *Attorney, Agent, or Firm* — Lightbulb IP, LLC

(57) ABSTRACT

A filament drive apparatus (101, 401) for use in an additive manufacturing system comprises a frame (102, 402) that supports a drive mechanism (103, 403). The drive mechanism (103, 403) comprises a roller arrangement (104, 404) and a belt drive arrangement (105, 405). The roller arrangement (104, 404) comprises at least one roller (106, 406) and presents a first filament engaging surface (107, 407). The belt drive arrangement (105, 405) comprises a belt (108, 408) that presents a second filament engaging surface (109, 409). The second filament engagement surface (109, 409) faces the first filament engaging surface (107, 407). An elongate and arcuate pathway (P) is defined between the first filament engaging surface (107, 407) and the second filament engaging surface (109, 409) along which advancement of a filament (110) in a drive direction is guided under the operation of the drive mechanism (103, 403).

15 Claims, 4 Drawing Sheets

(51) Int. Cl.
    *B29C 64/118*     (2017.01)
    *B33Y 30/00*     (2015.01)

(56) References Cited

U.S. PATENT DOCUMENTS

| | | | | |
|---|---|---|---|---|
| 4,571,220 | A * | 2/1986 | Nakano | F16H 7/08 |
| | | | | 474/100 |
| 4,633,177 | A * | 12/1986 | David | B65H 59/16 |
| | | | | 226/171 |
| 6,719,275 | B1 | 4/2004 | Waterson | |
| 9,808,986 | B2 * | 11/2017 | Toh | B29C 64/106 |
| 2013/0307193 | A1 * | 11/2013 | Johnson | C09J 129/04 |
| | | | | 264/401 |
| 2016/0107384 | A1 * | 4/2016 | Enache | B29C 64/141 |
| | | | | 425/375 |
| 2017/0157826 | A1 * | 6/2017 | Hishiki | B29C 48/2888 |
| 2018/0154586 | A1 * | 6/2018 | Wang | B29C 64/20 |
| 2019/0193331 | A1 * | 6/2019 | Welling | B29C 64/118 |
| 2019/0275737 | A1 * | 9/2019 | Hsiao | B33Y 40/00 |

FOREIGN PATENT DOCUMENTS

| | | |
|---|---|---|
| EP | 3045292 A1 | 7/2016 |
| FR | 1404352 A | 6/1965 |
| WO | WO99/23026 A1 | 5/1999 |

\* cited by examiner

FILAMENT DRIVE APPARATUS

FIELD OF THE INVENTION

The present invention relates to apparatus for use in an additive manufacturing system, in particular to filament drive apparatus.

BACKGROUND OF THE INVENTION

Additive manufacturing involves creating physical objects by the successive addition of material to form a structure.

The benefits of modern additive manufacturing processes include enabling prototypes and low volumes of a product to be made more cost-effectively and/or more quickly than with other manufacturing processes, and enabling complex geometries to be formed that are difficult or impossible to achieve with traditional manufacturing processes.

In 3D printing, digital data is used control the deposition of material on a print bed or surface, which fuses together, to progressively build a three-dimensional object. Typically, a digital model is used in which an object is represented as a series of slices that are then translated into a series of component layers of material during the physical manufacture of the object.

According to a known type of 3D printing process, the material is provided as a filament, which is unwound from a spool during production of an object. The filament is fed by a drive mechanism to a hot end, through which controlled amounts of heated filament material are issued according to a printing program. The hot end of a 3D printing machine is most commonly moved using a movable rail or arm structure that allows positioning in accordance with a Cartesian, Polar, Scara or a Delta co-ordinate system.

A known type of extrusion system is a 'Direct extruder', in which the drive mechanism is attached to the hot end, so that the distance between from drive mechanism to the hot end is very short. Another known type of extrusion system is a 'Bowden tube extruder', in which the drive mechanism is apart from the hot end and a tube extends the distance between the drive mechanism and the hot end. Yet another known type of set-up is a 'Flying extruder', in which the extruder is suspended by means of an elastic or inelastic support arrangement close above the hot end. This serves to reduce weight on the hot end, leading to higher resolution prints, and helps with printing using flexible and exotic filaments without blockages.

Different 3D printing filaments are available, and the selection of a particular filament may dependent on many factors, such as: the object to be printed; the intended use of the object; the cost of the material, physical and aesthetic properties of the material (for example, chemical formulation, thermal resistance, strength, flexibility, durability, solubility, adhesion and deformation characteristics, colour, surface finish and reflectivity); workability considerations (for example, warping or shrinking tendencies of the material, consistency of end result); environmental and safety considerations (for example, resources required to manufacture the filament, recyclability of objects formed from the material, toxicity during and after production).

During an additive manufacturing process, the filament is pushed forwards, in a feed direction, to advance material to be deposited from a nozzle during a print phase; however, the filament may also be pulled backwards, in a retraction direction, to help prevent material from being deposited from the nozzle during a non-print phase.

A known cause of 3D printing failure relates to poor control over the filament feed. The operational performance of a typical drive mechanism is dependent upon a number of aspects of contact between gear teeth and the filament, including the direction that the teeth meet the filament, the area and depth of contact between the teeth and the filament.

However, discrepancies in the driving of the filament, which can cause variations in the speed and smoothness of filament flow, can lead to problems such as under-extrusion, or jamming of the hot end. Feed consistency issues can also arise from, or be related to, non-uniformity in filament diameter, a changing curvature of the filament as the spool empties, and fluctuations in melt temperature at the hot end.

It is desirable to provide improvements in the reliability of driving the filament.

SUMMARY OF THE INVENTION

According to a first aspect there is provided filament drive apparatus for use in an additive manufacturing system, the filament drive apparatus comprising a frame supporting a drive mechanism, the drive mechanism comprising: a roller arrangement comprising at least one roller and presenting a first filament engaging surface, and a belt drive arrangement comprising a belt presenting a second filament engaging surface, facing the first filament engaging surface, wherein an elongate and arcuate pathway is defined between the first filament engaging surface and the second filament engaging surface along which advancement of a filament in a drive direction is guided under the operation of the drive mechanism; wherein the belt drive arrangement comprises a belt tensioner device for guiding the second filament engaging surface towards the first filament engaging surface, wherein the belt tensioner device comprises a tensioner pulley located within the loop formed by the belt, and wherein, when the drive mechanism is in operation, the tensioner pulley functions to adjust the tension in the belt.

In an example, the belt drive arrangement is configured to drive the belt in both a first drive direction and a second drive direction, one of the first and second drive directions being a feed direction and the other of the first and second drive directions being a retraction direction.

In an example, the tensioner pulley has a position that is adjustable as a filament is being advanced in a drive direction under the operation of the drive mechanism.

According to filament drive apparatus of the present invention, the tensioner pulley is movable, during operation of the drive mechanism, between different positions representing different degrees of belt tension. The position of the tensioner pulley dynamically adjusts, as a filament is being driven, to maintain a constant tension. In this way, a desired degree of contact between the first and second filament engaging surfaces and the filament, by means of which the risk of undesirable slippage of the filament, is achieved. This beneficial feature of the invention is operational both when the filament is being driven in a feed direction and in a retraction direction.

The tensioner pulley may be movable between a first position representing a maximum degree of belt tension and a second position representing a minimum degree of belt tension by one of: angular motion, translational motion.

The roller arrangement may comprise a series of rollers, and each roller of the series of rollers may provide a sector of the first filament engaging surface.

The roller arrangement may comprise a single roller that provides said first filament engaging surface.

The or each roller may comprise a surface profile that defines a recessed circumferential region in which a filament may extend.

The belt may comprise a planar outer face.

The belt drive arrangement may have an open belt drive configuration.

The belt may be driven around a first, driver pulley and a second, driven pulley.

The elongate and arcuate pathway may be disposed between a first filament port and a second filament port.

Further particular and preferred aspects of the present invention are set out in the dependent claims.

BRIEF DESCRIPTION OF THE DRAWINGS

The present invention will now be more particularly described, with reference to the accompanying drawings, in which.

DESCRIPTION

Example embodiments are described below in sufficient detail to enable those of ordinary skill in the art to embody and implement the apparatus, systems and processes described herein. It is to be understood that embodiments can be provided in many alternate forms and the invention should not be construed as limited to the specific embodiments and examples set forth herein but by the scope of the appended claims.

A filament drive apparatus for use in an additive manufacturing system will now be described.

Figure 1:
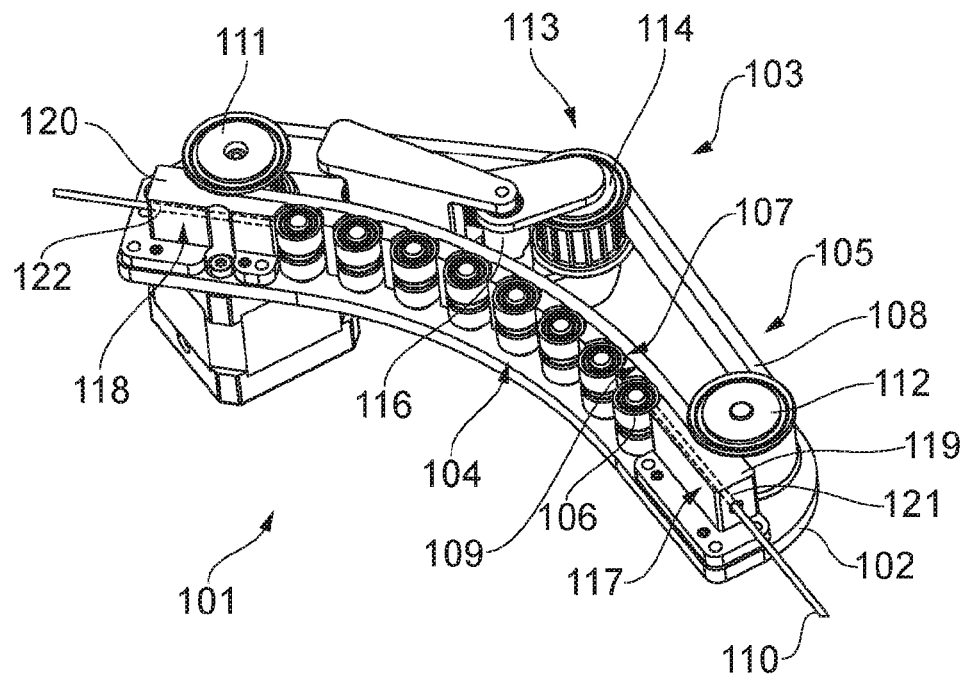
FIG. 1 shows a first perspective view of a first filament drive apparatus.
Figure 2:
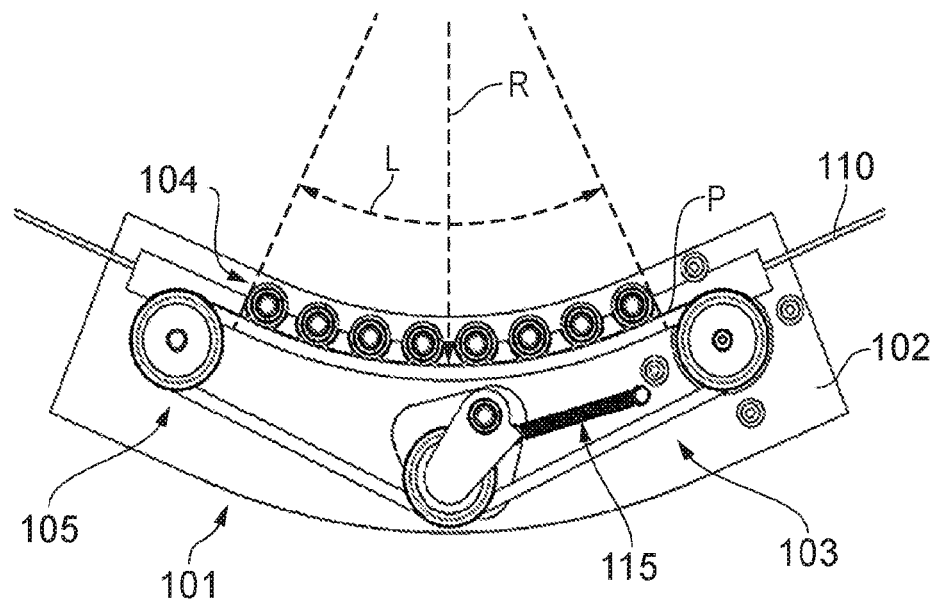
FIG. 2 shows a plan view of the first filament drive apparatus of FIG. 1.
Figure 3:
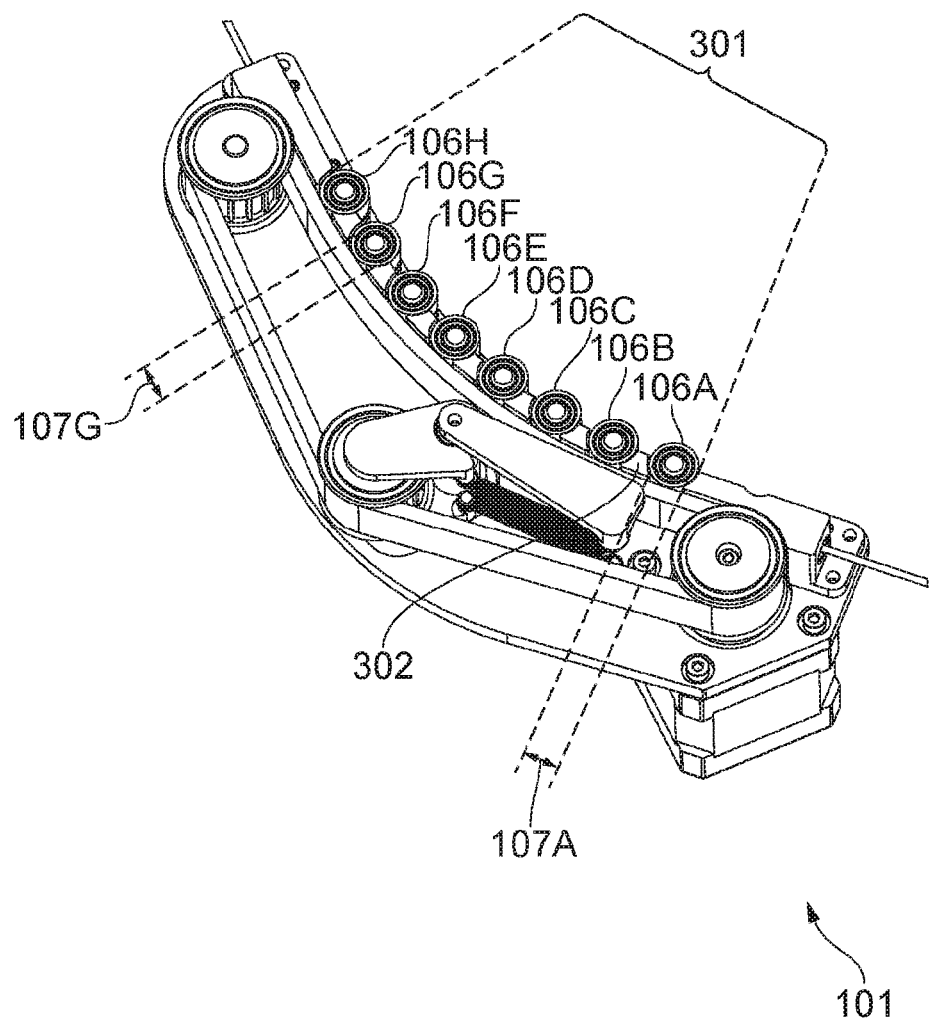
FIG. 3 shows a second perspective view of the first filament drive apparatus of FIG. 1.

Filament drive apparatus 101 is shown in FIGS. 1 to 3. The filament drive apparatus 101 may be used in a Bowden tube extruder.

The filament drive apparatus 101 comprises a frame 102, which supports a drive mechanism, indicated generally at 103.

As will be described in further detail below, the drive mechanism 103 comprises a roller arrangement 104 and a belt drive arrangement 105. The roller arrangement 104 comprises at least one roller, such as roller 106, and presents a first filament engaging surface, indicated at 107. The belt drive arrangement 105 comprises a belt 108 that presents a second filament engaging surface 109, which faces the first filament engaging surface 107.

An elongate and arcuate pathway P is defined between the first filament engaging surface 107 and the second filament engaging surface 109, along which advancement of a filament, such as filament 110, in a drive direction, is guided under the operation of the drive mechanism 103.

The elongate and arcuate pathway P may have any suitable radius R and any suitable length L.

In an example, the elongate and arcuate pathway P has a radius in the range 10 to 180 degrees inclusive. In an example, the elongate and arcuate pathway P has a radius R of 148.5 degrees. In an example, the elongate and arcuate pathway P has a length in the range 20 mm to 500 mm inclusive. In an example, the elongate and arcuate pathway P has a length L of 117.7 mm.

The drive mechanism 103 is advantageously arranged to provide an increased extent of contact with the filament 110, in the length direction thereof, along the elongate and arcuate pathway P, to improve drive reliability.

In the illustrated arrangement, the belt drive arrangement 105 has an open belt drive configuration, in which belt 108 is driven around a first, driver pulley 111 and a second, driven pulley 112. Rotation of the first, driver pulley 111 may be powered by any suitable motor, which may allow the belt 108 to be driven in both a feed direction and a retraction direction.

As shown, the belt drive arrangement 105 comprises a belt tensioner device 113 for guiding the second filament engaging surface 109 towards the first filament engaging surface 107.

When the drive mechanism 103 is in operation, the belt tensioner device 113 functions to adjust the tension in the belt 108 to cause the second filament engaging surface 109 to press against a filament 110 being advanced in the drive direction to, in turn, push the filament 110 towards the first filament engaging surface 107. In this way, the desired degree of contact between the first and second filament engaging surfaces 107, 109 and the filament 110 is achieved. Squeezing the filament between the first and second filament engaging surfaces 107, 109 reduces the risk of undesirable slippage.

In this example, the belt tensioner device 113 comprises a tensioner pulley 114 located within the loop formed by the belt 108, the tensioner pulley 114 having a position that is adjustable as a filament 110 is being advanced in a drive direction under the operation of the drive mechanism 103. The tensioner pulley 114 is movable, during operation of the drive mechanism 103, between different positions representing different degrees of belt tension. The position of the tensioner pulley 413 is dynamically adjustable, as a filament is being driven. In this way, a constant tension, and a desired degree of contact between the first and second filament engaging surfaces and the filament, can be maintained. In turn, this reduces the risk of undesirable slippage of the filament.

The tight side of the belt 108 provides the second filament engaging surface 109. The belt tensioner device 113 comprises a tensioner pulley 114 that acts against the slack side of the belt 108, from inside the loop formed by the belt 108. Under the action of a spring arrangement 115, the tensioner pulley 114 is movable, relative to a pivot shaft 116, in a first direction of rotation, to move the tensioner pulley 114 outwardly, away from the tight side of the belt 108, to increase the tension in the belt 108, and in a second, opposite direction of rotation, to move the tensioner pulley 114 inwardly, towards the tight side of the belt 108, to decrease the tension in the belt 108. It is to be appreciated that any movement arrangement comprising a resilient element that provides the functionality of the spring arrangement may be utilised.

The tensioner pulley 114 is movable between a first position, representing a maximum degree of belt tension and a second position, representing a minimum degree of belt tension, by angular motion. The tensioner pulley 114 is freely rotatable about a tensioner pulley shaft.

The belt 108 is thus shown surrounding three pulleys of the drive mechanism 103; driver pulley 111, driven pulley 112 and tensioner pulley 114. The driver pulley 111 and driven pulley 112 each have a position that is fixed during operation of the drive mechanism 103 and the tensioner pulley 114 has a position that is adjustable during operation of the drive mechanism 103. It is to be appreciated however that the position of each of the driver pulley 111 and the driven pulley 112 may be adjusted when the belt 108 is not being driven.

The filament 110 is thus constrained along the elongate and arcuate pathway P, between the first filament engaging surface 107 of the roller arrangement 104, and the second filament engaging surface 109 of the belt drive arrangement 105 as it travels through the filament drive apparatus 101.

According to the embodiment illustrated in FIGS. 1 to 3, the roller arrangement 104 comprises a series of rollers 301, and each roller 106A-106H of the series of rollers 301 provides a sector 107A-107H respectively of the first filament engaging surface 107. Each roller 106A-106H is freely rotatable about a respective roller shaft. In this specific illustrated example, the number of rollers 106 in the series of rollers 301 is 8. However, it is to be appreciated that the number of rollers in the series of rollers may be any suitable number. In an example, the number of rollers in the series of rollers is in the range 2 to 16 inclusive.

The use of a series of rollers 301 beneficially enables a relatively large radius R of the elongate and arcuate pathway P to be achieved within a relatively small footprint.

According to this illustrated example, a post is located between each pair of adjacent rollers, such as post 302 between rollers 106A and 106B, which may also provide a sector of the first filament engaging surface 107.

In this illustrated example, the elongate and arcuate pathway P of the filament drive apparatus 101 is disposed between a first filament port 117 and a second filament port 118, each filament port 117, 118 arranged to receive the filament 110 therethrough.

In this specific example, each of the first and second filament ports 117, 118 comprises a body 119, 120 respectively that defines a channel 121, 122 respectively therein. The first filament port 117 functions to guide a section of the filament 110 into the elongate and arcuate pathway P defined between the roller arrangement 104 and the belt drive arrangement 105 and the second filament port 118 functions to guide a section of the filament 110 away from the elongate and arcuate pathway P. The channels 121, 122 define a vertical position for entry and exit of the section of the filament 110 into and from the elongate and arcuate pathway P.

According to the shown example, the rollers 106A-106H of the roller arrangement 104 and the pulleys 111, 112, 114 of the belt drive arrangement 105 rotate around respect shafts, each shaft extending substantially parallel to each other shaft. In addition, in this present example, the frame 102 has a substantially planar upper surface, indicated 123 and each shaft extends substantially perpendicularly to, and upwardly from, the substantially planar upper surface 123 of the frame 102.

The belt 108 may be fabricated from any suitable material or combination of materials, and may have any suitable dimensions and surface profile. The belt 108 may have a planar outer face, which provides the second filament engaging surface. In an example, the belt is made from a nylon and glass fibre material. In another example, the belt is made from a rubber material. In an example, the belt has a length of 260 mm and a width of 16 mm (with any suitable depth).

In this example, the diameter of the second, driven pulley 112 is substantially the same as the diameter of the first, driver pulley 111, but may differ in other examples. In an example, the second, driven pulley has a smaller diameter then the first, driver pulley.

In this example, the diameter of the tensioner pulley 114 is substantially the same as the diameter of the first, driver pulley 111 and of the second, driven pulley 112, but may differ from the diameter of the first, driver pulley 111 and/or the second, driven pulley 112 in other examples.

Each pulley 111, 112, 114 of the belt drive arrangement 105 may be fabricated from any suitable material or combination of materials, and may have any suitable dimensions and surface characteristics. Each pulley 111, 112, 114 may have any suitable surface profile, which may include ribs or teeth that extend in the axial direction of, and are distributed in the radial direction around, the pulley. In an example, the first, driver pulley has a first number of ribs or teeth and the second, driven pulley has a second number of rib or teeth that is less than the first number. In an example, the first, driver pulley has ribs or teeth and the second, driven pulley does not. In an example, the tensioner pulley has ribs or teeth. In an example, at least one of the pulleys is made from a glass reinforced plastic (GRP) material. In an example, at least one of the pulleys is made from acrylonitrile butadiene styrene (ABS). In an example, at least one of the pulleys is made from aluminium.

It is to be appreciated that the belt drive arrangement 105 may comprise any suitable number of pulleys, in any suitable arrangement, any may comprise any suitable type of belt tensioner device.

In an example, a pulley has a diameter of 24 mm.

The or each roller 106 of the roller arrangement 104 may be fabricated from any suitable material or combination of materials, and may have any suitable dimensions and surface characteristics. The or each roller 106 may have any suitable surface profile, which may define a recessed circumferential region in which a filament may extend, such that the vertical position of the filament is constrained as it is being driven along the elongate and arcuate pathway P. In an example, the or at least one roller is made from a glass reinforced plastic (GRP) material. In an example, the or at least one roller is made from acrylonitrile butadiene styrene (ABS). In an example, the or at least one roller is made from aluminium.

In an example, a roller has a diameter of 12 mm.

The frame 102 may be fabricated from any suitable material or combination of materials. In an example, the frame is made from a plastics material. In an example, the frame is made from a metal material, such as aluminium.

Figure 4:
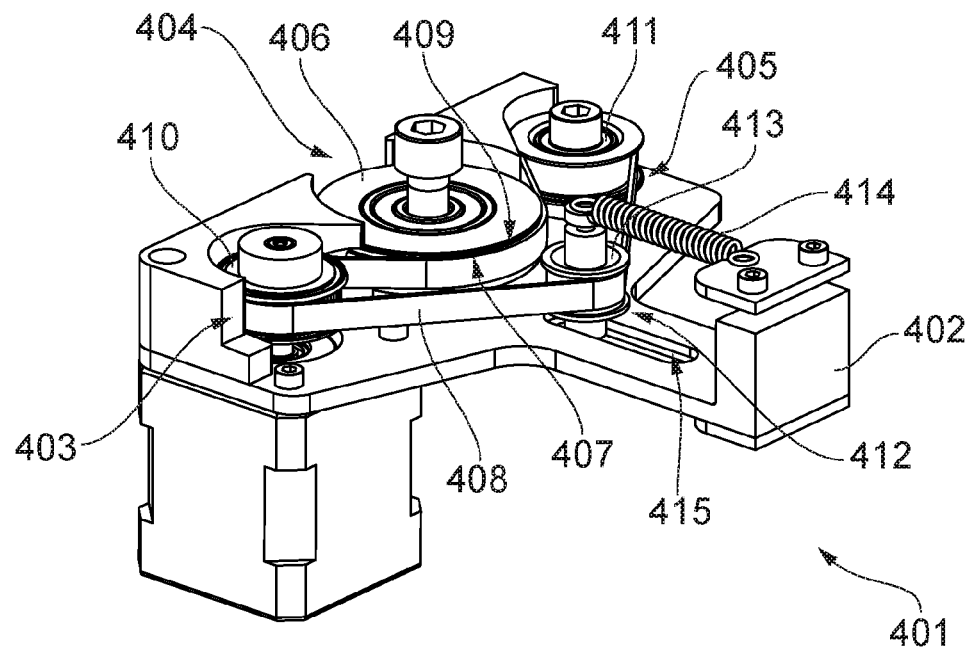
FIG. 4 shows a first perspective view of a second filament drive apparatus.
Figure 5:
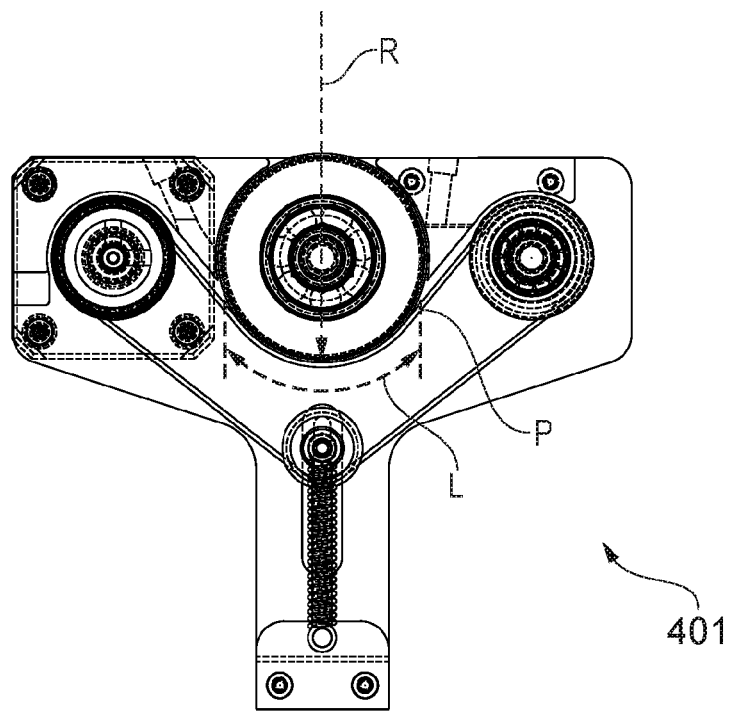
FIG. 5 shows a plan view of the second filament drive apparatus of FIG. 4.
Figure 6:
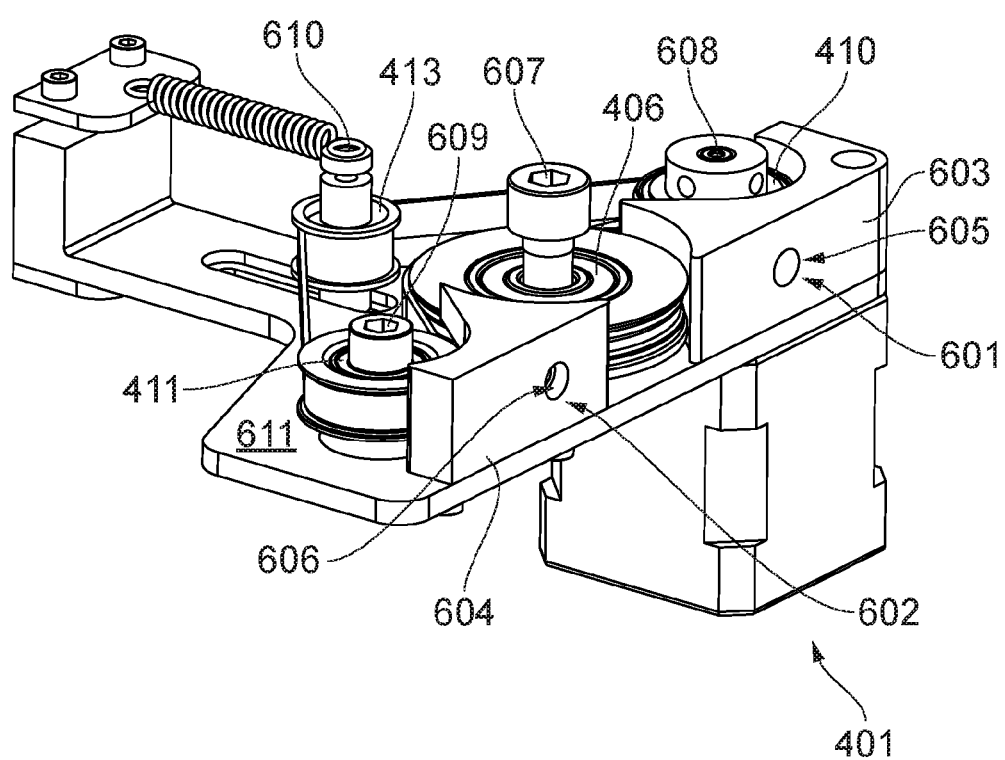
FIG. 6 shows a second perspective view of the second filament drive apparatus of FIG. 4.

Filament drive apparatus 401 is shown in FIGS. 4 to 6.

The second filament drive apparatus 401 of FIGS. 4 to 6 achieves the same functional objective as the first filament drive apparatus 101 of FIGS. 1 to 3 but has a physical arrangement that differs therefrom, as will now be described.

The filament drive apparatus 401 comprises a frame 402, which supports a drive mechanism, indicated generally at 403.

The drive mechanism 403 comprises a roller arrangement 404 and a belt drive arrangement 405. The roller arrangement 404 comprises at least one roller, such as roller 406, and presents a first filament engaging surface, indicated at 407, and the belt drive arrangement 405 comprises a belt 408 that presents a second filament engaging surface 409, which faces the first filament engaging surface 407.

According to the embodiment illustrated in FIGS. 4 to 6, the roller arrangement 404 comprises a single roller 406 only. The single roller 406 provides the first filament engaging surface 407. The single roller 406 is freely rotatable about a roller shaft.

The roller arrangement 404 of filament drive apparatus 401 thus differs from the roller arrangement 104 of filament drive apparatus 101 in the number of rollers (roller arrangement 104 comprises more than one roller and roller arrangement 404 comprises only one roller).

An elongate and arcuate pathway P is defined between the first filament engaging surface 407 and the second filament engaging surface 409, along which advancement of a filament, in a drive direction, is guided under the operation of the drive mechanism 403.

The elongate and arcuate pathway P may have any suitable radius R and any suitable length L.

In an example, the elongate and arcuate pathway P has a radius R of 148.5 degrees. In an example, the elongate and arcuate pathway P has a length in the range 20 mm to 500 mm inclusive. In an example, the elongate and arcuate pathway P has a length L of 117.7 mm.

Similar to the drive mechanism 103 of filament drive apparatus 101, the drive mechanism 403 of filament drive apparatus 401, is advantageously arranged to provide an increased extent of contact with a filament, in the length direction thereof, along the elongate pathway P, to improve drive reliability.

In the illustrated arrangement, the belt drive arrangement 405 has an open belt drive configuration, in which belt 408 is driven around a first, driver pulley 410 and a second, driven pulley 411. Rotation of the first, driver pulley 410 may be powered by any suitable motor, which may allow the belt 408 to be driven in both a feed direction and a retraction direction.

The belt drive arrangement 405 further comprises a belt tensioner device 412 for guiding the second filament engaging surface 409 towards the first filament engaging surface 407.

When the drive mechanism 403 is in operation, the belt tensioner device 412 functions to adjust the tension in the belt 408 to cause the second filament engaging surface 409 to press against a filament being advanced in the drive direction to, in turn, push the filament towards the first filament engaging surface 407. In this way, the desired degree of contact between the first and second filament engaging surfaces 407, 409 and the filament is achieved. Squeezing the filament between the first and second filament engaging surfaces 407, 409 reduces the risk of undesirable slippage.

When the drive mechanism 403 is operating to drive a filament in feed direction F, the tight side of the belt 408 provides the second filament engaging surface 409. The belt tensioner device 412 comprises a tensioner pulley 413 that acts against the slack side of the belt 408, from inside the loop formed by the belt 408. Under the action of a spring arrangement 414, the tensioner pulley 413 is movable, within a slot 415, in a first direction, to move the tensioner pulley 413 outwardly, away from the tight side of the belt 408, to increase the tension in the belt 408, and in a second, opposite direction, to move the tensioner pulley 413 inwardly, towards the tight side of the belt 408, to decrease the tension in the belt 408. It is to be appreciated that any movement arrangement comprising a resilient element configured to provide the functionality of the spring arrangement may be utilised.

Thus, the belt tensioner device 412 comprises a tensioner pulley 413 located within the loop formed by the belt 408, the tensioner pulley 413 having a position that is adjustable as a filament is being advanced in a drive direction under the operation of the drive mechanism 403. The tensioner pulley 413 is movable, during operation of the drive mechanism 403, between different positions representing different degrees of belt tension. The position of the tensioner pulley 413 dynamically adjusts, as a filament is being driven. In this way, a constant tension, and a desired degree of contact between the first and second filament engaging surfaces and the filament, can be maintained, thereby achieving a reduced risk of undesirable slippage of the filament.

The tensioner pulley 413 is movable between a first position, representing a maximum degree of belt tension and a second position, representing a minimum degree of belt tension, by translational motion. The tensioner pulley 413 is freely rotatable about a tensioner pulley shaft.

In this example, the belt tensioner device 412 comprises a tensioner pulley 413 that is moved in translation. The belt tensioner device 412 of filament drive apparatus 401 thus differs from the belt tensioner device 113 of filament drive apparatus 101, which moves in rotation.

A filament is thus constrained along the elongate and arcuate pathway P, between the first filament engaging surface 407 of the roller arrangement 404, and the second filament engaging surface 409 of the belt drive arrangement 405 as it travels through the filament drive apparatus 401.

In this illustrated example, the elongate and arcuate pathway P of the filament drive apparatus 101 is disposed between a first filament port 601 and a second filament port 602, each filament port 601, 602 arranged to receive a filament, such as filament 110 shown in FIG. 1, therethrough.

In this specific example, each of the first and second filament ports 601, 602 comprises a body 603, 604 respectively that defines a channel 605, 606 respectively therein. The first and second filament ports 601, 602 function to guide a section of a filament into and away from the elongate and arcuate pathway P defined between the roller arrangement 404 and the belt drive arrangement 405. In particular, the channels 605, 606 define a vertical position for entry and exit of the section of the filament to and from the elongate and arcuate pathway P.

According to the shown example, the roller 406 of the roller arrangement 404 and the pulleys 410, 411, 413 of the belt drive arrangement 405 rotate around respective shafts 607, 608, 609, 610, each shaft extending substantially parallel to each other shaft. In addition, in this present example, the frame 402 has a substantially planar upper surface, indicated 611 and each shaft 607, 608, 609, 610 extends substantially perpendicularly to, and upwardly from, the substantially planar upper surface 611 of the frame 402.

The belt 408 may be fabricated from any suitable material or combination of materials, and may have any suitable dimensions and surface profile. The belt 408 may have a planar outer face, which provides the second filament engaging surface. In an example, the belt is made from a nylon and glass fibre material. In another example, the belt is made from a rubber material. In an example, the belt has a length of 260 mm and a width of 16 mm (with any suitable depth).

In this example, the diameter of the second, driven pulley 411 is substantially the same as the diameter of the first, driver pulley 410, but may differ in other examples. In an example, the second, driven pulley has a smaller diameter then the first, driver pulley.

In this example, the diameter of the tensioner pulley 413 is smaller than the diameter of the first, driver pulley 410 and of the second, driven pulley 411, but may be substantially the same as, or larger than, the diameter of the first, driver pulley 410 and/or the second, driven pulley 411 in other examples.

Each pulley 410, 411, 413 of the belt drive arrangement 405 may be fabricated from any suitable material or combination of materials, and may have any suitable dimensions and surface characteristics. Each pulley 410, 411, 413 may have any suitable surface profile, which may include ribs or teeth that extend in the axial direction of, and are distributed in the radial direction around, the pulley. In an example, the first, driver pulley has a first number of ribs or teeth and the second, driven pulley has a second number of rib or teeth that is less than the first number. In an example, the first, driver pulley has ribs or teeth and the second, driven pulley does not. In an example, the tensioner pulley has ribs or teeth. In an example, at least one of the pulleys is made from a glass reinforced plastic (GRP) material. In an example, at least one of the pulleys is made from acrylonitrile butadiene styrene (ABS). In an example, at least one of the pulleys is made from aluminium.

It is to be appreciated that the belt drive arrangement 405 may comprise any suitable number of pulleys, in any suitable arrangement, any may comprise any suitable type of belt tensioner device, having any suitable arrangement.

The roller 406 of the roller arrangement 404 may be fabricated from any suitable material or combination of materials, and may have any suitable dimensions and surface characteristics. The roller may have any suitable surface profile, which may define a recessed circumferential region in which a filament may extend, such that the vertical position of the filament is constrained as it is being driven along the elongate and arcuate pathway P. In an example, the roller is made from a glass reinforced plastic (GRP) material. In an example, the roller is made from acrylonitrile butadiene styrene (ABS). In an example, the roller is made from aluminium.

The frame 402 may be fabricated from any suitable material or combination of materials. In an example, the frame is made from a plastics material. In an example, the frame is made from a metal material, such as aluminium.

A filament drive apparatus according to the disclosure herein may be used to drive a 3D printing filament of any suitable type. A filament drive apparatus according to the disclosure herein may be used to drive a filament having any suitable diameter. A filament drive apparatus according to the disclosure herein may be used to drive a filament having a diameter in the range 1.75 mm to 3 mm inclusive.

A filament drive apparatus according to the disclosure herein may be used to drive a filament fabricated from any suitable material or materials. A filament drive apparatus according to the disclosure herein may be used to drive a standard, flexible or exotic filament. A filament drive apparatus according to the disclosure herein may be used to drive a filament made from polylactic acid (PLA), acrylonitrile butadiene styrene (ABS), carbon, nylon.

The present application discloses a filament feeder that uses a belt together with a curved surface to optimise the surface area of contact on the filament.

Filament drive apparatus according to the present application may be used to drive a filament for use in any suitable type of 3D printing machine, which may, for example, be a Cartesian 3D printer or a Delta 3D printer.

Although illustrative embodiments of the invention have been disclosed in detail herein, with reference to the accompanying drawings, it is to be understood that the invention is not limited to the precise embodiments and examples shown and that various changes and modifications can be effected therein by one skilled in the art without departing from the scope of the invention as defined by the appended claims.

The invention claimed is:

1. Filament drive apparatus for use in an additive manufacturing system, the filament drive apparatus comprising a frame supporting a drive mechanism, the drive mechanism comprising:
   a roller arrangement comprising at least one roller and presenting a first filament engaging surface, and
   a belt drive arrangement comprising a belt, the belt forming a loop and presenting a second filament engaging surface, facing the first filament engaging surface,
   wherein an elongate and arcuate pathway is defined between the first filament engaging surface and the second filament engaging surface along which advancement of a filament in a drive direction is guided when the drive mechanism is in operation;
   the belt drive arrangement comprises a belt tensioner device for guiding the second filament engaging surface towards the first filament engaging surface,
   the belt tensioner device comprises a tensioner pulley located within the loop formed by the belt, and the tensioner pulley has a position that is adjustable as a filament is being advanced in a drive direction under the operation of the drive mechanism;
   when the drive mechanism is in operation, the belt tensioner device functions to adjust the tension in the belt, whereby the belt tensioner device causes the second filament engaging surface to press against a filament being advanced in the drive direction to, in turn, push the filament towards the first filament engaging surface, wherein, when the drive mechanism is in operation, the position of the tensioner pulley dynamically adjusts, as a filament is being driven, to maintain a constant tension; and
   wherein the belt drive arrangement is configured to drive the belt in both a first drive direction and a second drive direction, a first of the first drive direction and the second drive direction being a feed direction and a second of the first drive direction and the second drive direction being a retraction direction.

2. The filament drive apparatus of claim 1, wherein, when the drive mechanism is in operation, the tensioner pulley is movable between a first position representing a maximum degree of belt tension and a second position representing a minimum degree of belt tension by angular motion.

3. The filament drive apparatus of claim 1, wherein, when the drive mechanism is in operation, the tensioner pulley is movable between a first position representing a maximum degree of belt tension and a second position representing a minimum degree of belt tension by translational motion.

4. The filament drive apparatus of claim 1, wherein the roller arrangement comprises a series of rollers, and each roller of said series of rollers provides a sector of said first filament engaging surface.

5. The filament drive apparatus of claim 4, wherein said series of rollers comprises a number of rollers that is in the range 2 to 16 inclusive.

6. The filament drive apparatus of claim 4, wherein each roller comprises a surface profile that defines a recessed circumferential region in which a filament may extend.

7. The filament drive apparatus of claim 1, wherein the roller arrangement comprises a single roller that provides said first filament engaging surface.

8. The filament drive apparatus of claim 7, wherein the single roller comprises a surface profile that defines a recessed circumferential region in which a filament may extend.

9. The filament drive apparatus of claim 1, wherein the belt comprises a planar outer face.

10. The filament drive apparatus of claim 1, wherein the belt drive arrangement has an open belt drive configuration.

11. The filament drive apparatus of claim 10, wherein the belt is driven around a first, driver pulley and a second, driven pulley.

12. The filament drive apparatus of claim 1, wherein the elongate and arcuate pathway is disposed between a first filament port and a second filament port.

13. The filament drive apparatus of claim 1, wherein the elongate and arcuate pathway has a radius in the range 10 to 180 degrees inclusive.

14. The filament drive apparatus of claim 1, wherein the elongate and arcuate pathway has a length in the range 20 mm to 500 mm inclusive.

15. An additive manufacturing system comprising a filament drive apparatus, the filament drive apparatus as claimed in claim 1.

* * * * *